United States Patent
Akers

(10) Patent No.: US 8,914,741 B1
(45) Date of Patent: Dec. 16, 2014

(54) LEVERAGING NAVIGATION TAB PLACEMENT FOR IN-PRODUCT DISCOVERY

(75) Inventor: John W. Akers, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 674 days.

(21) Appl. No.: 13/273,010

(22) Filed: Oct. 13, 2011

(51) Int. Cl.
- *G06F 3/048* (2013.01)
- *G06F 3/0483* (2013.01)

(52) U.S. Cl.
CPC .............. *G06F 3/048* (2013.01); *G06F 3/0483* (2013.01)
USPC ............................ 715/777; 715/762; 715/744

(58) Field of Classification Search
CPC ... G06F 3/048; G06F 3/0483; G06F 3/04817; G06F 3/0482
USPC .......................................... 715/777, 762, 744
See application file for complete search history.

(56) References Cited

U.S. PATENT DOCUMENTS

| | | | |
|---|---|---|---|
| 7,680,756 B2 * | 3/2010 | Quinn et al. | 706/50 |
| 7,692,628 B2 * | 4/2010 | Smith et al. | 345/157 |
| 8,442,844 B1 * | 5/2013 | Trandal et al. | 705/4 |
| 8,725,597 B2 * | 5/2014 | Mauseth et al. | 705/28 |
| 2002/0133369 A1 * | 9/2002 | Johnson | 705/1 |
| 2003/0101116 A1 * | 5/2003 | Rosko et al. | 705/35 |
| 2003/0120711 A1 * | 6/2003 | Katz | 709/106 |
| 2003/0182378 A1 * | 9/2003 | Treptow et al. | 709/206 |
| 2004/0136698 A1 * | 7/2004 | Mock | 386/123 |
| 2006/0164396 A1 * | 7/2006 | Anderson | 345/172 |
| 2006/0178961 A1 * | 8/2006 | Stanley et al. | 705/31 |
| 2008/0114618 A1 * | 5/2008 | Pysnik et al. | 705/3 |
| 2009/0070148 A1 * | 3/2009 | Skocic | 705/3 |
| 2010/0070928 A1 * | 3/2010 | Goodger et al. | 715/838 |
| 2010/0100440 A1 * | 4/2010 | Nickelson et al. | 705/14.52 |

\* cited by examiner

*Primary Examiner* — Linh K Pham
(74) *Attorney, Agent, or Firm* — Osha Liang LLP

(57) ABSTRACT

A method to assist a user of a software application. The method steps include displaying, in a user interface window, a first group of navigation tabs corresponding to an active set of features and a second group of navigation tabs corresponding to an inactive set of features, disposed at a first location and a second location, respectively, within the user interface window, and wherein the user is authorized to access the active set of features based on a user license and unauthorized to access the inactive set of features based on the user license, receiving a notification regarding a modification of the user license, wherein the user is authorized to access an activated feature of the inactive set of features based on the modification, and relocating a navigation tab of the second group to the first location.

18 Claims, 5 Drawing Sheets

LEVERAGING NAVIGATION TAB PLACEMENT FOR IN-PRODUCT DISCOVERY

BACKGROUND

In the area of graphical user interfaces (GUI), a tabbed document interface (TDI) is one that allows multiple documents to be contained within a single window, using tabs as a navigational widget for switching between sets of documents. TDI is an interface style most commonly associated with web browsers, web applications, text editors, and preference panes. In keeping with the desktop metaphor, GUI tabs are modeled after traditional card tabs inserted in paper files or card indexes.

Software as a service (SaaS), also referred to as "on-demand software," is a software delivery model in which software and its associated data are hosted centrally (e.g., in the Internet) and are typically accessed by users using a thin client, such as using a web browser over the Internet. SaaS has become a common delivery model for most business applications, including accounting, collaboration, customer relationship management (CRM), enterprise resource planning (ERP), invoicing, human resource management (HRM), content management (CM) and service desk management. Whether in an online configuration or a desktop configuration, SaaS products often use a purchasing model that entails offering a core set of functionality (often for free with SaaS subscription) and allowing the user to pay for additional functionality modules from a selection menu.

SUMMARY

In general, in one aspect, the invention relates to a method to assist a user of a software application. The method steps include displaying, in a user interface window of the software application executing on a hardware processor, a first group of navigation tabs corresponding to an active set of features of the software application and a second group of navigation tabs corresponding to an inactive set of features of the software application, wherein the first group is disposed at a first location within the user interface window and the second group is disposed at a second location within the user interface window, separate from the first location, and wherein the user is authorized to access the active set of features based on a user license and unauthorized to access the inactive set of features based on the user license, receiving a notification regarding a modification of the user license, wherein the user is authorized to access an activated feature of the inactive set of features based on the modification, and modifying, by the hardware processor, the user interface window to relocate a navigation tab of the second group of navigation tabs corresponding to the activated feature from the second location to the first location.

In general, in one aspect, the invention relates to a system to assist a user in using a software application. The system includes (i) a processor, (ii) memory storing instructions when executed by the processor comprising functionalities to display, in a user interface window of the software application, a first group of navigation tabs corresponding to an active set of features of the software application and a second group of navigation tabs corresponding to an inactive set of features of the software application, wherein the first group is disposed at a first location within the user interface window and the second group is disposed at a second location within the user interface window, separate from the first location, and wherein the user is authorized to access the active set of features based on a user license and unauthorized to access the inactive set of features based on the user license, receive a notification regarding a modification of the user license, wherein the user is authorized to access an activated feature of the inactive set of features based on the modification, and modify the user interface window to relocate a navigation tab of the second group of navigation tabs corresponding to the activated feature from the second location to the first location, and (iii) a license server coupled to the processor and configured to manage the user license.

In general, in one aspect, the invention relates to a non-transitory computer readable medium storing instructions to assist a user in using a software application, the instructions when executed by a computer comprising functionality to display, in a user interface window of the software application, a first group of navigation tabs corresponding to an active set of features of the software application and a second group of navigation tabs corresponding to an inactive set of features of the software application, wherein the first group is disposed at a first location within the user interface window and the second group is disposed at a second location within the user interface window, separate from the first location, and wherein the user is authorized to access the active set of features based on a user license and unauthorized to access the inactive set of features based on the user license, receive a notification regarding a modification of the user license, wherein the user is authorized to access an activated feature of the inactive set of features based on the modification, and modify the user interface window to relocate a navigation tab of the second group of navigation tabs corresponding to the activated feature from the second location to the first location.

Other aspects of the invention will be apparent from the following detailed description and the appended claims.

DETAILED DESCRIPTION

Figure 1:
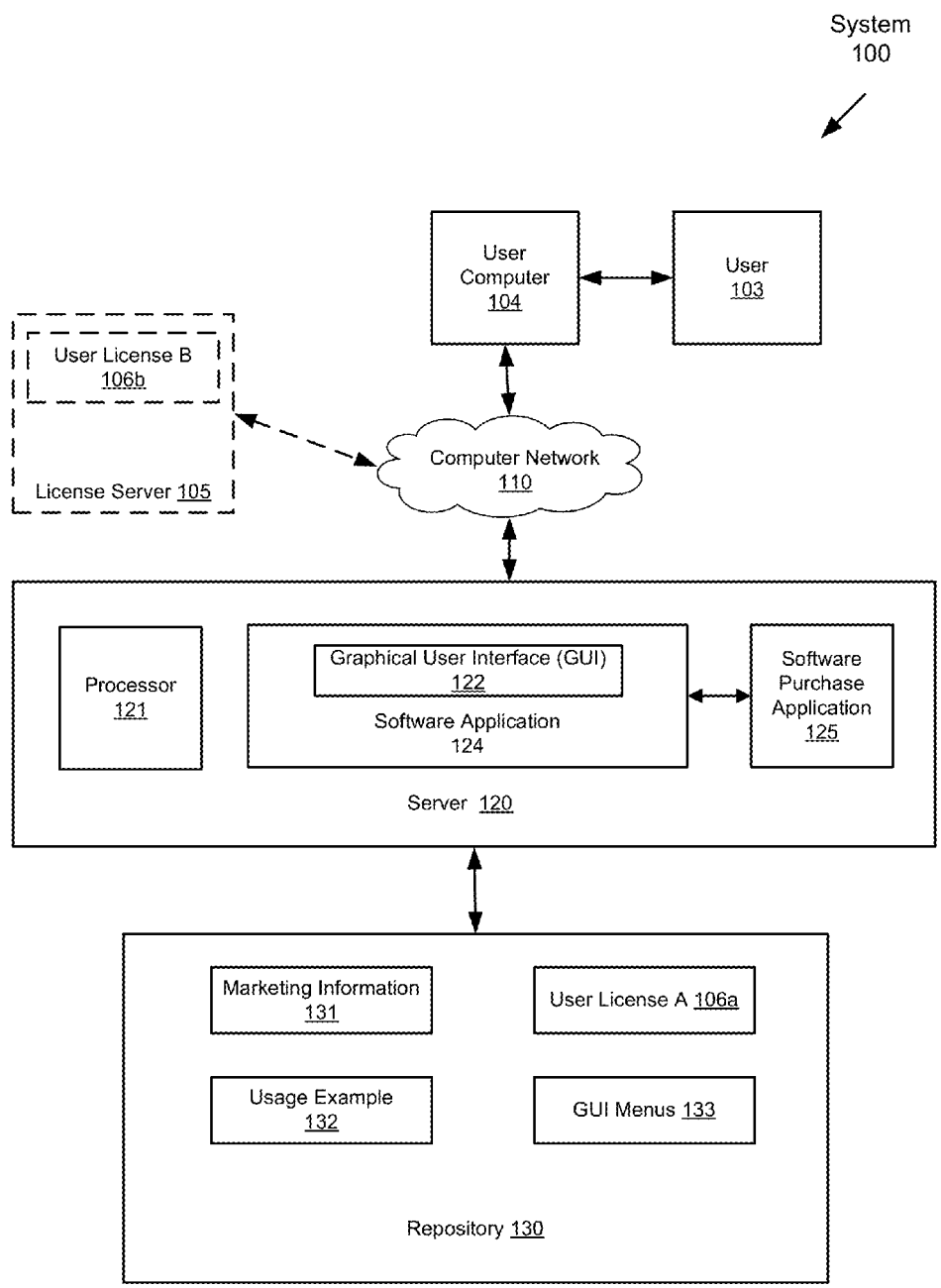
FIG. 1 shows a schematic diagram of a system of leveraging navigation tab placement for in-product discovery in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As noted above, SaaS products often use a purchasing model that offers a core set of functionality for free and allows the user to pay for additional functional modules as needed using a software license scheme. A difficulty in such purchasing model is how to effectively advertise additional functionality in the product, at point of need, in a way that doesn't adversely affect the user experience of the core functionality. For example, navigation tabs at the top of SaaS software GUI are used as a means of navigating through a software program (e.g., for accounting, collaboration, CRM, ERP, invoicing, HRM, CM, service desk management, etc.) or initiating actions within the software program. Specifically, navigating through the software program refers to visiting various GUI screens presented by the software program to the user in a workflow to perform a function (e.g., of accounting, collaboration, CRM, ERP, invoicing, HRM, CM, service desk management, etc.). Each GUI screen includes the content (referred to as a document) related to the function being performed as well as navigation tabs for selectively re-directing to the next GUI screen depending on the workflow requirement. The resulting sequence of GUI screens presented to the user corresponds to the steps in the workflow and is limited by the functionality the user is authorized to access based on the purchased license. Such user interface can be confusing to the user if tabs for unpurchased features were integrated side-by-side with, and in the same manner as, tabs for functionality the user already has access to.

Embodiments of the invention provide a method for web sites or desktop software programs to distinguish between purchased and unpurchased functionalities. Specifically, this distinction in the user interface of the software program is accomplished by varying the position of those tabs (or other GUI control elements) corresponding to purchased functionality from other tabs (or other GUI control elements) corresponding to unpurchased functionality. For example, tabs for unpurchased functionality may be right-aligned so as to create a separation with other tabs for functionality the user has paid for, which are left-aligned. Typically, navigation/action tabs are present on every GUI screen of the SaaS web sites or desktop software programs. Whenever the user may think of a certain feature not yet purchased, the corresponding tab for that feature is readily available in the GUI being presented to the user at that moment.

This solution could potentially be extended beyond just tabs to GUI control elements such as menus and icon toolbars. The same principle would apply, to separate the menus/menu items/toolbars/toolbar icons for functionality that has not been purchased from those with functionality that has been purchased.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a social survey system in accordance with embodiments disclosed herein.

As shown in FIG. 1, the system (100) includes user computer (104) of the user (103), and server (120) coupled via computer network (110). For example, the computer network (110) may include wired and/or wireless portions of the Internet and/or other data communications networks such as wide area networks (WANs), local area networks (LANs), etc. Further, the server (120) includes processor (121) configured to execute software application (124) having graphical user interface (GUI) (122) and software purchase application (125). Optionally, the system (100) may also include license server (105) coupled to the server (120) via the computer network (110) and configured to allow the user (103) to access an additional functional module of the software application (124) by way of purchasing the user license B (106b) issued by the license server (105).

The system (100) includes repository (130) operatively coupled to the server (120). The repository (130) may be used for storing marketing information (131), usage example (132), user license A (106a), and GUI menus (133). In one or more embodiments, the repository (130) is a persistent storage device (or set of devices) and is configured to store data for use by the software application (124) and software purchase application (125). The repository (130) (and/or any of the data items stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The repository (130) may be a device internal to the server (120). Alternatively, the repository (130) may be an external storage device operatively connected to the server (120).

In one or more embodiments of the invention, the software application (124) includes software instructions, when executed by the processor (121), having functionality to display, in the GUI (122) of the software application, a first group of navigation tabs corresponding to an active set of features of the software application (124) and a second group of navigation tabs corresponding to an inactive set of features of the software application (124). Specifically, these groups of navigation tabs and certain functional contents are displayed in a user interface window (i.e., a GUI screen) of the GUI (122). In one or more embodiments, the first group is disposed at a first location within the user interface window of the GUI (122) and the second group is disposed at a second location within the user interface window that is separate from the first location. In particular, the user is authorized to access the active set of features based on a previously purchased user license A (106a) and unauthorized to access the inactive set of features based on the previously purchased user license A (106a). An example screenshot of the GUI (122) is described in reference to FIG. 3A below where the first location and the second location are left justified and right justified, respectively, in the user interface window. In other examples, the first location and the second location may be top justified and bottom justified, respectively, in the user interface window.

Generally, the GUI (122) may include multiple user interface windows (i.e., multiple GUI screens) and is navigated by user selection of a navigation tab in the first group of navigation tabs. Specifically, such navigation tab selected by the user (103) allows the user (103) to access a corresponding active feature. For example, selecting the navigation tab may cause an action to be performed regarding the active feature. In another example, selecting the navigation tab may cause a different user interface window of the GUI (122) to be displayed to the user (103) regarding the active feature.

In one or more embodiments, when the user (103) selects another navigation tab in the second group of navigation tabs corresponding to an inactive feature, information related to such inactive feature is displayed in the user interface window of the GUI (122). For example, the information related to the inactive feature may include a user interface menu (e.g., one of the GUI menus (133)), marketing information (e.g., marketing information (131)), or usage example (e.g., usage example (132)), associated with the inactive feature. Although the inactive feature and the user interface menu thereof are not accessible to the user (103), such information is intended to introduce more details of the inactive feature to the user (103) in addition to what the label on the navigation tab may convey to the user (103). For example, one of the GUI menus (133) may be displayed to introduce available options related to the inactive feature, the marketing information (131) may be displayed to introduce the benefit of the inactive feature, or the usage example (132) may be displayed to introduce the application of the inactive feature. In one or more embodiments, such information related to the inactive feature is displayed in a designated area (e.g., in proximity to the corresponding navigation tab or in a fixed location) of the user interface window where the first group and the second group of navigation tabs belong. In one or more embodiments, such information related to the inactive feature is displayed in a pop up window overlaying the user interface window where the first group and the second group of navigation tabs belong.

In response to viewing the information related to the inactive feature that is displayed in or overlaying the user interface window, the user (103) may decide to purchase an additional function module of the software application (124) that provides such inactive feature. In one or more embodiments, the user (103) can initiate such purchase from within the same location where the information related to the inactive feature is displayed. In one or more embodiments, the additional functional module of the software application (124) is purchased using the software purchase application (125). For example, the software purchase application (125) may be launched when the user initiates the purchase from within the same location where the information related to the inactive feature is displayed. An example GUI screenshot illustrating such purchase initiation is described in reference to FIG. 3A below.

In one or more embodiments, purchasing the additional function module of the software application (124) updates the previously purchased user license A (106a) to activate the purchased inactive feature into an activated feature. For example, the user license A (106a) may be updated by the software purchase application (125) to reflect the previously inactive feature being activated as a result of the purchase. In one or more embodiments, in response to the purchase, the software purchase application (125) is configured to modify the user license A (106) and send a notification to the software application (124) regarding the license modification turning the previously inactive feature into the activated feature.

In one or more embodiments, the software application (124) is further configured to receive, from the software purchase application (125), the notification regarding the modification of the user license A (106a) and the activation of the previously inactive feature. Accordingly, the software application (124) modifies the user interface window to relocate a navigation tab (within the second group of navigation tabs) corresponding to the previously inactive feature from the second location to the first location reflecting that the previously inactive feature is now the activated feature. As a result, the user is now authorized to access the now activated feature of the inactive set of features based on the modification of the user license A (106a). An example GUI screenshot illustrating modifying such user interface window is described in reference to FIG. 3B below.

In one or more embodiments, the system (100) optionally includes the license server (105) that is configured to manage the user license of the software application (124). Specifically, the license server (105) is configured to process the modification of the user license based on the aforementioned purchase by the user (103) that activates an inactive feature into the activated feature. For example, the user license B (106b) may correspond to an additional functional module of the software application (124) that provides the now activated feature. Accordingly, the license server (105) may send a notification to the processor (121) to update the user license A (106a) by adding the user license B (106b).

Figure 2:
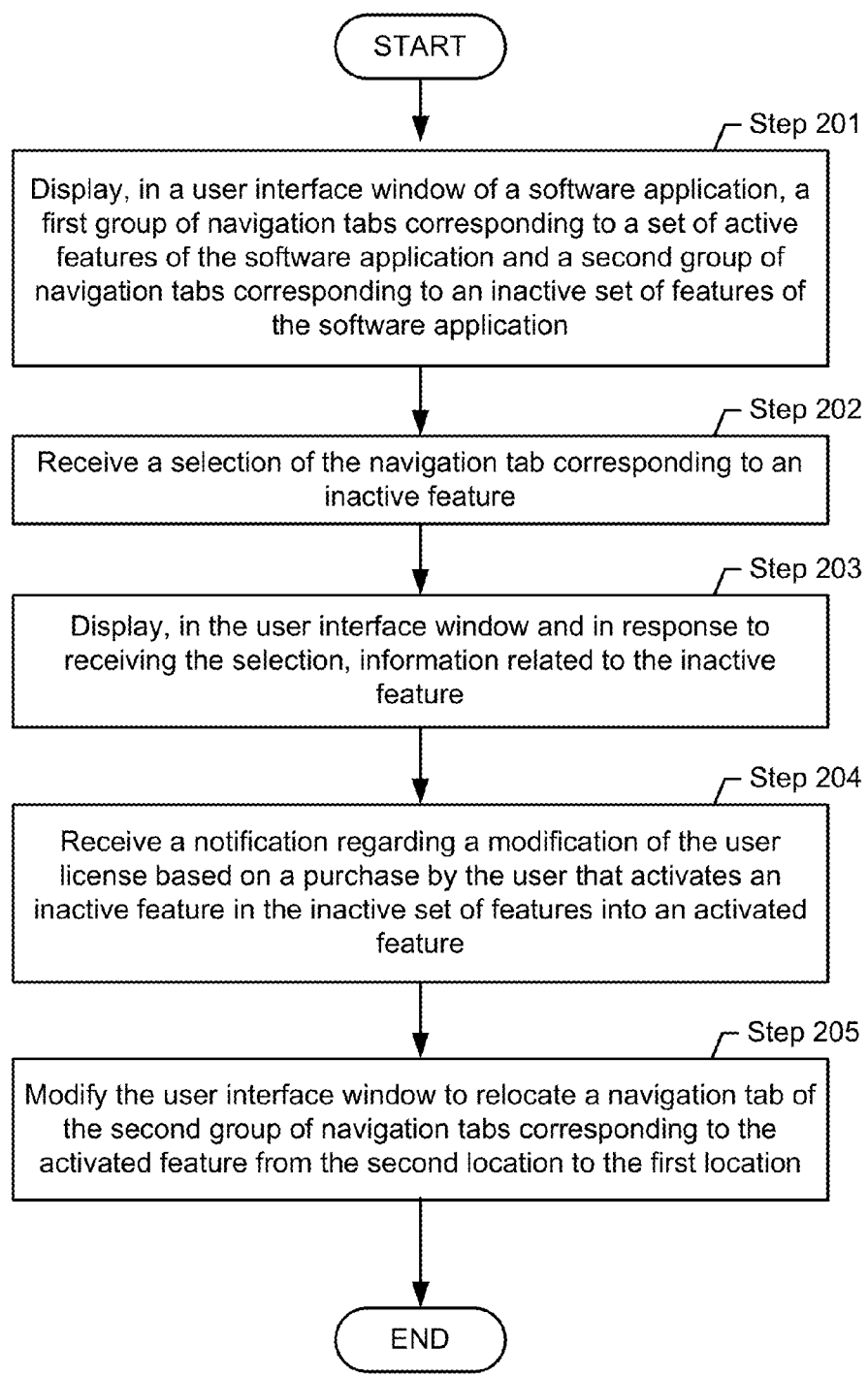
FIG. 2 shows a flowchart of a method of leveraging navigation tab placement for in-product discovery in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

As noted above, embodiments of the invention provide a method to assist a user of a software application in navigating GUI screens (referred to as user interface windows) of the software application to perform a function based on active features of the software application. Initially in Step 201, a first group and a second group of navigation tabs are displayed in a user interface window of the software application. Specifically, the first group of navigation tabs corresponds to an active set of features of the software application and the second group of navigation tabs corresponds to an inactive set of features of the software application. Generally, the user license of the software application purchased by the user defines the active set of features and the inactive set of features. Specifically, the user is authorized to access the active set of features based on the user license and unauthorized to access the inactive set of features based on the user license.

In one or more embodiments, the first group of navigation tabs is disposed at a first location within the user interface window and the second group is disposed at a second location within the user interface window, separate from the first location. For example, the first group and the second group may be left justified and right justified, respectively, along a horizontal navigation bar of the user interface window. In another example, the first group and the second group may be top justified and bottom justified, respectively, along a vertical navigation bar of the user interface window. An example user interface window illustrating separate locations for the navigation tabs is described in reference to FIG. 3A below.

In Step 202, a selection of a navigation tab corresponding to an inactive feature is received. For example, the user may select any of the navigation tabs in the first group or the second group when the software application is being used. Generally, selecting a navigation tab in the first group corresponding to an active feature would re-direct the user to another user interface window or perform an action of the active feature. In Step 203, selecting a navigation tab in the second group corresponding to an inactive feature would cause information related to the inactive feature to be displayed to the user. In one or more embodiments, the information related to the inactive feature includes a user interface menu, marketing information, or usage example associated with the inactive feature. By displaying such information, additional details of the inactive feature are introduced to the user beyond what may have been conveyed by the label of the selected navigation tab.

For example, the user interface menu of the inactive feature may be displayed to introduce available options related to the inactive feature, the marketing information may be displayed to introduce the benefit of the inactive feature, or the usage example may be displayed to introduce the application of the inactive feature. In one or more embodiments, such information related to the inactive feature is displayed in a designated area (e.g., in proximity to the corresponding navigation tab or in a fixed location) of the user interface window where the first group and the second group of navigation tabs belong. In one or more embodiments, such information related to the inactive feature is displayed in a pop up window overlaying the user interface window where the first group and the second group of navigation tabs belong.

In response to viewing the information related to the inactive feature that is displayed in or overlaying the user interface window, the user may decide to purchase an additional function module of the software application that provides such inactive feature. In one or more embodiments, the user can initiate such purchase from within the same location where the information related to the inactive feature is displayed. In one or more embodiments, the additional functional module of the software application is purchased using a software purchase application. For example, the software purchase application may be launched when the user initiates the purchase from within the same location where the information related to the inactive feature is displayed. An example GUI screenshot illustrating such purchase initiation is described in reference to FIG. 3A below.

In one or more embodiments, purchasing the additional function module of the software application updates a previously purchased user license to activate the purchased inactive feature into an activated feature. For example, the user license may be updated by the software purchase application to reflect the previously inactive feature being activated as a result of the purchase. In one or more embodiments, in response to the purchase, the software purchase application modifies the previously purchased user license and sends a notification to the software application regarding the license modification turning the previously inactive feature into the activated feature.

In Step 204, the notification regarding the modification of the user license and the activation of the previously inactive feature is received by the software application. For example, such notification may be received from the software purchase application. In Step 205, the user interface window of the software application is modified to relocate a navigation tab (within the second group of navigation tabs) corresponding to the previously inactive feature from the second location to the first location reflecting that the previously inactive feature is now the activated feature. As a result, the user is now authorized to access the now activated feature of the inactive set of features based on the modification of the user license. An example GUI screenshot illustrating modifying such user interface window is described in reference to FIG. 3B below.

Figure 3A:
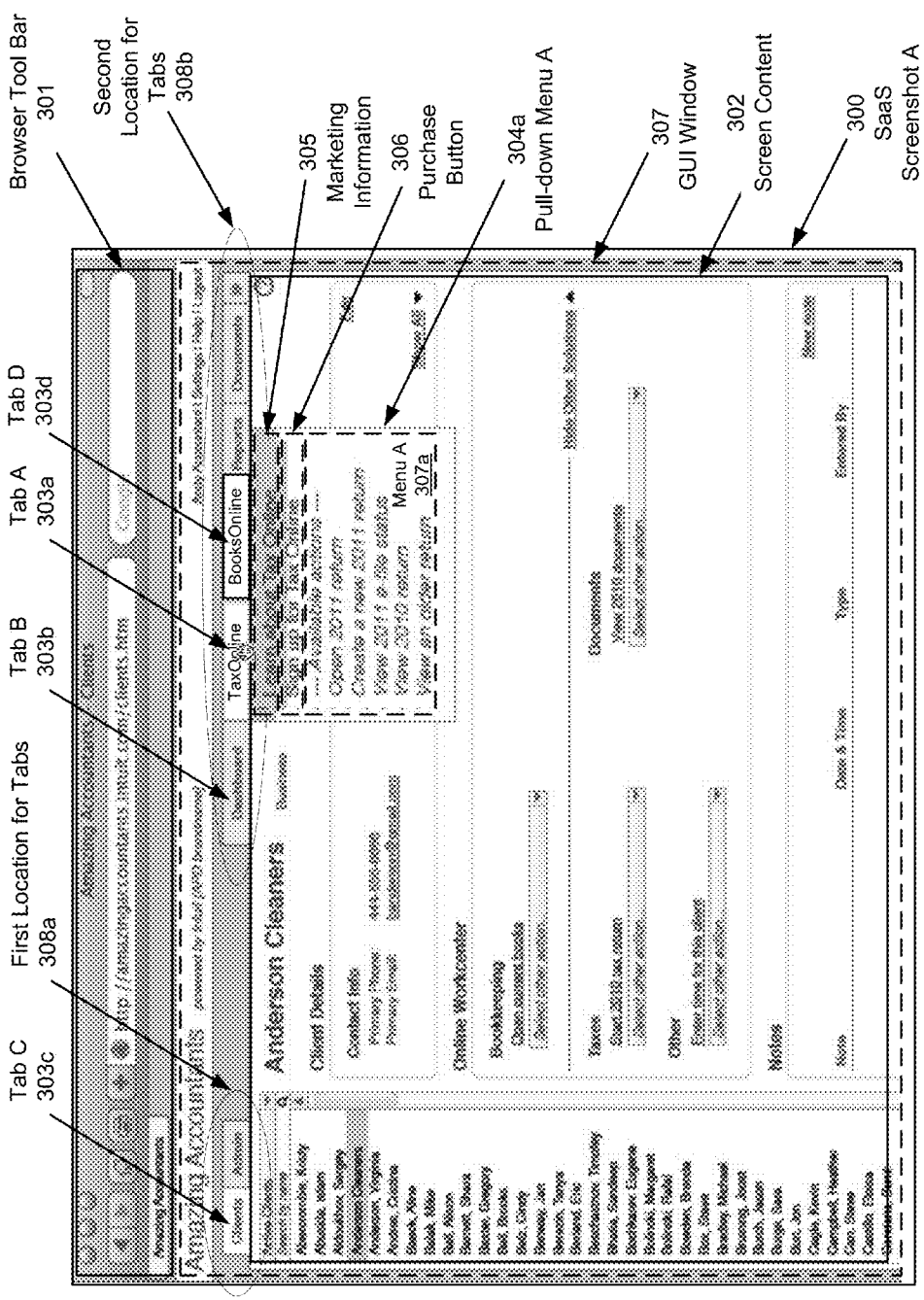
FIGS. 3A and 3B show an example of leveraging navigation tab placement for in-product discovery in accordance in accordance with one or more embodiments of the invention.
Figure 3B:
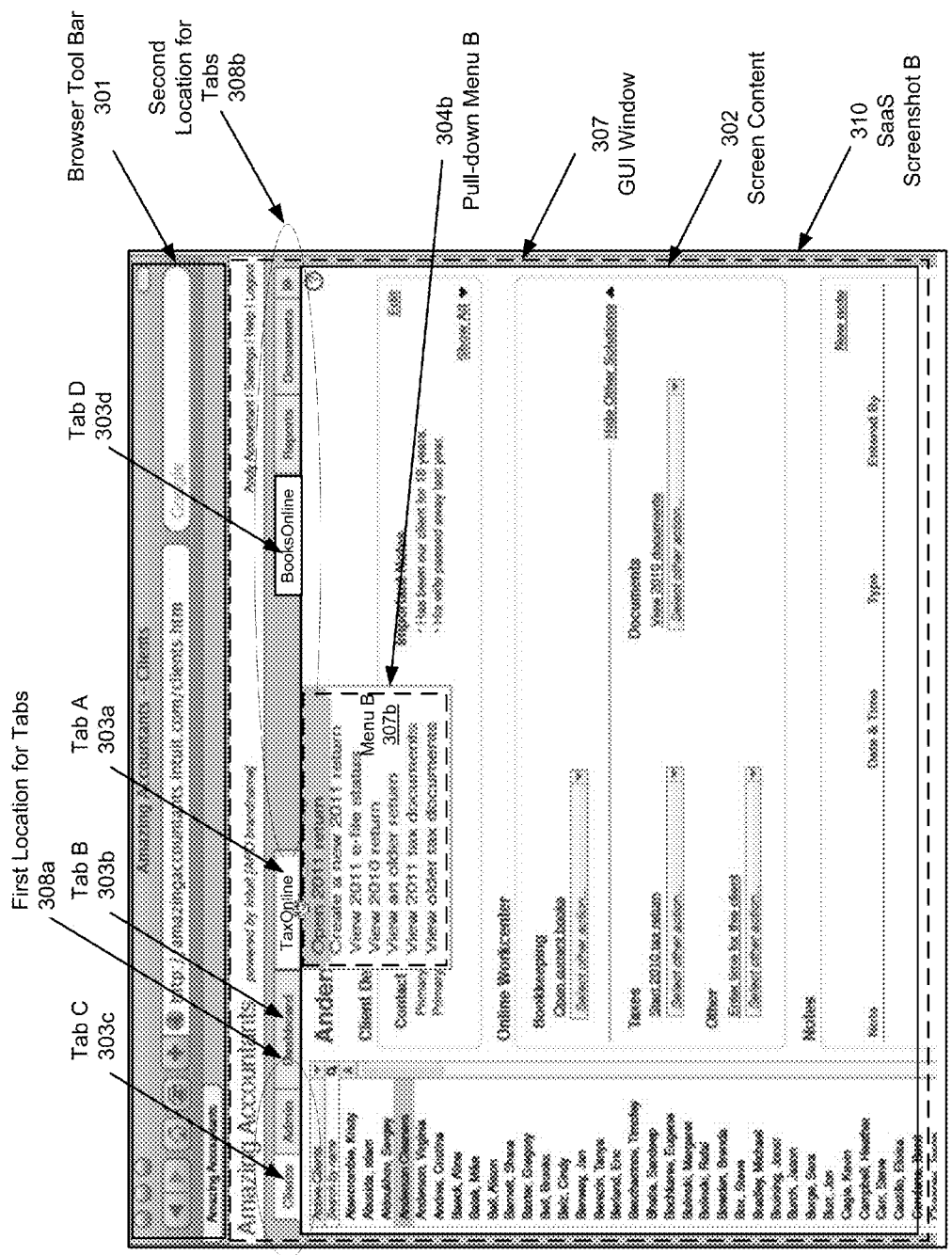

FIGS. 3A-3B show an application example in accordance with one or more embodiments of the invention. This example application may be practiced using the system (100) of FIG. 1 and based on the method described with respect to FIG. 2 above. FIGS. 3A-3B depict a scenario of leveraging navigation tab placement for in-product discovery of unpurchased features.

An accountant Andy who owns an accounting firm "Amazing Accountants" purchased a client data management program from a SaaS provider that enables Amazing Accountants to manage all of the information about their clients from a single place. The purchased client data management program is a program module of a larger suite of offerings from the SaaS provider. In addition to the function provided by the client data management program, this larger product suite enables accountants to run all aspects of their business from one place. Some of the other program modules that are part of this suite include a tax return program (TaxOnline), an accounting program (BooksOnline), and a document management program (DocsOnline).

The example shown in FIGS. 3A-3B is based on Andy logging into this client data management program to organize information for clients of the Amazing Accountants. FIG. 3A shows the SaaS screenshot A (300) captured from Andy's user computer, such as the user computer (104) described in FIG. 1 above. In particular, the client data management program is hosted on a server (e.g., server (120) of FIG. 1) of the SaaS provider and accessed by Andy typing the server web address into the browser tool bar (301) depicted in the SaaS screenshot A (300). When the client data management program launches from the SaaS server, Andy sees tabs (e.g., tab A (303a) through tab D (303d)) and screen content (302) in a GUI window (307) of the client data management program. Specifically, information in the GUI window (307) is transmitted from the SaaS server to be displayed on Andy's user computer. As shown in FIG. 3A, the screen content (302) is based on Andy's selection of "Anderson Cleaners" in a client menu controlled by the Tab C (303c) "Clients." The screen content (302) contains information related to tax items organized by Andy using the client data management program.

Further as shown in FIG. 3A, the tabs are separated into two groups where tab A (303a), tab B (303b), and tab D (303d) correspond to unpurchased functionality and are located on the right side (referred to as the second location for tabs (308b)) of the navigation tab row. Separately, tab C (303c) corresponds to purchased functionality and is left-aligned (referred to as the first location for tabs (308a)) in the navigation tab row. Generally, selecting a tab (e.g., tab C (303c) "Clients") corresponding to purchased functionality either causes an action (e.g., retrieving a tax item for a selected client "Anderson Cleaners") to be performed or re-direct the GUI window (307) to display other content (e.g., information related to another client when the selected client is changed) different from the screen content (302).

When viewing the GUI window (307), in particular the labels of various tabs in the second location for tabs (308b), Andy becomes interested in the unpurchased feature "TaxOnline" and rolls over (referred to as a mouse hover, represented by the 'hand' icon in FIG. 3A) the corresponding tab A (303a) to explore additional information related to the unpurchased feature "TaxOnline." In response to the mouse hover, the pull-down menu A (304a) is displayed overlapping the GUI window (307) to show marketing information (305), purchase button (306), and menu A (307a). As shown, the menu A (307a) includes some of the available actions that the tab A (303a) provides, the marketing information (305) includes a link to a separate marketing page to learn more about usage examples and benefits of the "TaxOnline" function. Although the available actions of the "TaxOnline" function are not yet accessible by Andy for a hands-on evaluation, after viewing the list of available actions and the benefit/usage example, Andy decides to purchase the functional modules providing the "TaxOnline" feature and "Dashboard" feature by clicking the purchase button (306). This opens a sales page in a separate tab (not shown) in the browser outside of the GUI window (307). After completing the purchasing procedure, Andy returns to the previous selected tab C (303c) and refresh the browser view, which is represented by the SaaS screenshot B (310) shown in FIG. 3B.

As shown in FIG. 3B, The tab A (303a) and tab B (303b) for functionality Andy just purchased have now moved to the left side (i.e., the first location for tabs (308a)) of the GUI window (307) and the items in the pull-down menu B (304b) below the tab A (303a) in the new location are now enabled. In addition, the marketing information (305) and purchase button (306) are removed and do not appear in the pull-down menu B (304b). For example, the relocation of tabs corresponding to purchased function may be implemented using CSS, JQuery, and/or server-side programming logic that reads the user's entitlements to arrange the tabs appropriately.

In addition, presentation of tabs corresponding to the unpurchased functionality can be tailored to be appropriate to the given situation. For example, the tab D (303*d*) "BooksOnline" is displayed for Andy based on his profile indicating that he may have the need to manage client accounting books. In this case of another individual user John who has no need to manage accounting books, the "BooksOnline" tab is not displayed in his GUI window.

Figure 4:
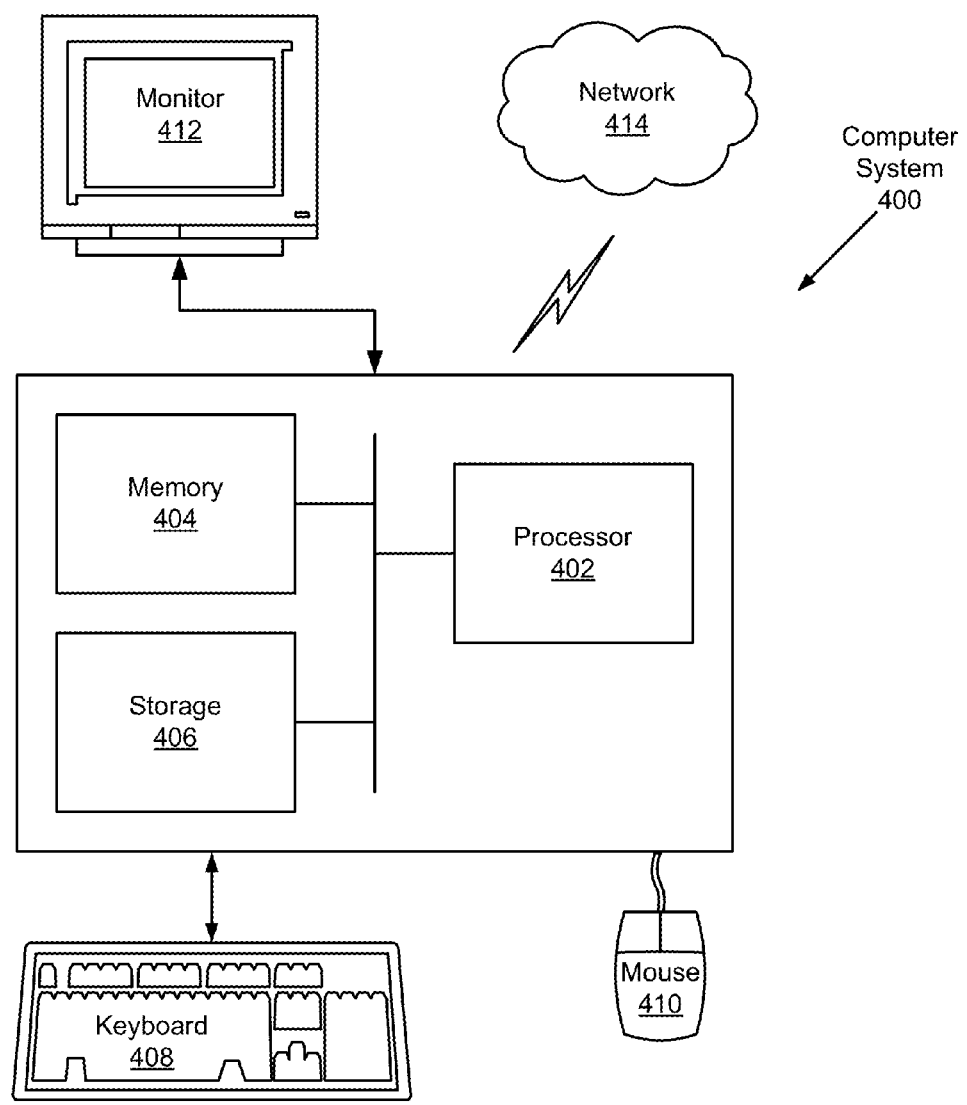
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to assist a user of a software application, comprising:

displaying, in a user interface window of the software application executing on a hardware processor, a first group of navigation tabs corresponding to an active set of features of the software application and a second group of navigation tabs corresponding to an inactive set of features of the software application, wherein the first group is disposed at a first location within the user interface window and the second group is disposed at a second location within the user interface window, separate from the first location, and wherein the user is authorized to access the active set of features based on a user license and unauthorized to access the inactive set of features based on the user license;

receiving a notification regarding a modification of the user license, wherein the user is authorized to access an activated feature of the inactive set of features based on the modification; and modifying, by the hardware processor, the user interface window to relocate a navigation tab of the second group of navigation tabs corresponding to the activated feature from the second location to the first location, wherein the modification of the user license is based on a purchase by the user that activates an inactive feature in the inactive set of features into the activated feature.

2. The method of claim 1, further comprising:

receiving, from the user prior to receiving the notification, a selection of the navigation tab corresponding to the inactive feature; and displaying, in the user interface window and in response to receiving the selection, information related to the inactive feature.

3. The method of claim 2, wherein the information related to the inactive feature comprises at least one selected from a group consisting of a user interface menu, marketing information, and usage example, associated with the inactive feature.

4. The method of claim 2, wherein the user decides to make the purchase in response to viewing the information related to the inactive feature in the user interface window.

5. The method of claim 1, wherein the first location and the second location are left justified and right justified, respectively, in the user interface window.

6. The method of claim 1, wherein the first location and the second location are top justified and bottom justified, respectively, in the user interface window.

7. A system to assist a user in using a software application, comprising:

a processor;

memory storing instructions when executed by the processor comprising functionalities to: display, in a user interface window of the software application, a first group of navigation tabs corresponding to an active set of features of the software application and a second group of navigation tabs corresponding to an inactive set of features of the software application, wherein the first group is disposed at a first location within the user interface window and the second group is disposed at a second location within the user interface window, separate from the first location, and wherein the user is authorized to access the active set of features based on a user license and unauthorized to access the inactive set of features based on the user license;

receive a notification regarding a modification of the user license, wherein the user is authorized to access an activated feature of the inactive set of features based on the modification; and modify the user interface window to relocate a navigation tab of the second group of navigation tabs corresponding to the activated feature from the second location to the first location; and a license server coupled to the processor and configured to manage the user license, wherein the license server is further configured to: process the modification of the user license based on a purchase by the user that activates an inactive feature in the inactive set of features into the activated feature; and send the notification to the processor.

8. The system of claim 7, wherein the instructions when executed by the processor further comprise functionalities to:

receive, from the user prior to receiving the notification, a selection of the navigation tab corresponding to the inactive feature; and display, in the user interface window and in response to receiving the selection, information related to the inactive feature.

9. The system of claim 8, wherein the information related to the inactive feature comprises at least one selected from a group consisting of a user interface menu, marketing information, and usage example, associated with the inactive feature.

10. The system of claim 8, wherein the user decides to make the purchase in response to viewing the information related to the inactive feature in the user interface window.

11. The system of claim 7, wherein the first location and the second location are left justified and right justified, respectively, in the user interface window.

12. The system of claim 7, wherein the first location and the second location are top justified and bottom justified, respectively, in the user interface window.

13. A non-transitory computer readable medium storing instructions to assist a user in using a software application, the instructions when executed by a computer comprising functionality to:

display, in a user interface window of the software application, a first group of navigation tabs corresponding to an active set of features of the software application and a second group of navigation tabs corresponding to an inactive set of features of the software application, wherein the first group is disposed at a first location within the user interface window and the second group is disposed at a second location within the user interface window, separate from the first location, and wherein the user is authorized to access the active set of features based on a user license and unauthorized to access the inactive set of features based on the user license;

receive a notification regarding a modification of the user license, wherein the user is authorized to access an activated feature of the inactive set of features based on the modification; and modify the user interface window to relocate a navigation tab of the second group of navigation tabs corresponding to the activated feature from the second location to the first location, wherein the modification of the user license is based on a purchase by the user that activates an inactive feature in the inactive set of features into the activated feature.

14. The non-transitory computer readable medium of claim 13, wherein the instructions when executed by the computer further comprise functionality to: receive, from the user prior to receiving the notification, a selection of the navigation tab corresponding to the inactive feature; and display, in the user interface window and in response to receiving the selection, information related to the inactive feature.

15. The non-transitory computer readable medium of claim 14, wherein the information related to the inactive feature comprises at least one selected from a group consisting of a user interface menu, marketing information, and usage example, associated with the inactive feature.

16. The non-transitory computer readable medium of claim 14, wherein the user decides to make the purchase in response to viewing the information related to the inactive feature in the user interface window.

17. The non-transitory computer readable medium of claim 13, wherein the first location and the second location are left justified and right justified, respectively, in the user interface window.

18. The non-transitory computer readable medium of claim 13, wherein the first location and the second location are top justified and bottom justified, respectively, in the user interface window.

* * * * *